United States Patent
Takeda et al.

(10) Patent No.: US 11,203,983 B2
(45) Date of Patent: Dec. 21, 2021

(54) METHOD OF OPERATING GAS TURBINE AND GAS TURBINE

(71) Applicant: Mitsubishi Power, Ltd., Yokohama (JP)

(72) Inventors: Hiroki Takeda, Tokyo (JP); Takashi Yokoyama, Tokyo (JP); Kenji Nanataki, Yokohama (JP); Tomoyuki Matsui, Yokohama (JP)

(73) Assignee: Mitsubishi Power, Ltd., Yokohama (JP)

( * ) Notice: Subject to any disclaimer, the term of this patent is extended or adjusted under 35 U.S.C. 154(b) by 133 days.

(21) Appl. No.: 16/711,877

(22) Filed: Dec. 12, 2019

(65) Prior Publication Data
US 2020/0277902 A1 Sep. 3, 2020

(30) Foreign Application Priority Data
Feb. 28, 2019 (JP) .............................. JP2019-035442

(51) Int. Cl.
*F02C 9/20* (2006.01)
*F02C 9/28* (2006.01)
*F02C 9/54* (2006.01)
*F04D 27/02* (2006.01)
*F04D 29/52* (2006.01)

(52) U.S. Cl.
CPC .................. *F02C 9/20* (2013.01); *F02C 9/28* (2013.01); *F02C 9/54* (2013.01); *F04D 27/023* (2013.01); *F04D 29/522* (2013.01); *F05D 2260/85* (2013.01); *F05D 2270/101* (2013.01); *F05D 2270/303* (2013.01); *F05D 2270/304* (2013.01)

(58) Field of Classification Search
CPC .... F02C 7/057; F02C 7/18; F02C 9/18; F02C 9/20; F02C 9/28; F02C 9/54; F04D 19/02; F04D 27/023; F04D 27/0246; F04D 29/522; F05D 2260/85; F05D 2270/101; F05D 2270/303; F05D 2270/304; F05D 2270/334
See application file for complete search history.

(56) References Cited

U.S. PATENT DOCUMENTS 3,994,617 A * 11/1976 McCombs .......... F04D 27/0223
                                                        415/28
2008/0279676 A1   11/2008 Dejoris et al.
(Continued)

FOREIGN PATENT DOCUMENTS

JP    2008-281001 A   11/2008
JP    2017-89414 A    5/2017

*Primary Examiner* — Jesse S Bogue
*Assistant Examiner* — Loren C Edwards
(74) *Attorney, Agent, or Firm* — Crowell & Moring LLP

(57) ABSTRACT

A gas turbine includes a compressor, a combustor, a turbine, a generator, and a control apparatus, the compressor being provided with an air extraction valves, a plurality of inlet guide vanes, and a plurality of casing air extraction valves at its last stage, in which the control is carried out on at least one of the opening of the air extraction valve, the opening of the inlet guide vanes, and the number of openings of the casing air extraction valves which are defined as control parameters taking blade vibration stress values as indexes based on a compressor metal temperature included in behavior parameters of the gas turbine.

8 Claims, 7 Drawing Sheets

(56) References Cited

U.S. PATENT DOCUMENTS

| | | | |
|---|---|---|---|
| 2014/0178176 A1* | 6/2014 | Takahashi | F01D 11/18 |
| | | | 415/1 |
| 2015/0003956 A1* | 1/2015 | Teicholz | F04D 27/0246 |
| | | | 415/1 |
| 2017/0089268 A1* | 3/2017 | Uyama | F02C 9/54 |
| 2018/0171875 A1 | 6/2018 | Okui et al. | |

* cited by examiner

METHOD OF OPERATING GAS TURBINE AND GAS TURBINE

CLAIM OF PRIORITY

The present application claims priority from Japanese Patent application serial No. 2019-035442, filed on Feb. 28, 2019, the content of which is hereby incorporated by reference into this application.

TECHNICAL FIELD

The present invention relates to a method of operating a gas turbine and a gas turbine, specifically, to a compressor control upon starting up and stopping the gas turbine.

BACKGROUND OF THE INVENTION

As the conventional method to prevent the turning stall of the gas turbine, e.g. such methods are proposed as disclosed in Japanese Unexamined Patent Application Publication Nos. 2008-281001 and 2017-89414. In Japanese Unexamined Patent Application Publication No. 2008-281001, such method of starting up a turbine is disclosed as including the steps of closing one or more air extraction valves so as to make the turning stall range shift to more high-speed turning range; partially opening the inlet guide vanes up to the position out of the turning stall range; and opening one or more air extraction valves while partially closing the inlet guide vanes at the same time so as to make a plurality of rotor blades pass through the turning stall range.

In Japanese Unexamined Patent Application Publication No. 2017-89414, such method of starting up a gas turbine including an extracted air passage to feed compressed air which is extracted from an air extraction chamber of the compressor to the turbine as the cooled air; an exhaust passage to exhaust the compressed air of the extracted air passage to a turbine exhaustion system; and an exhaust valve provided on the exhaust passage is disclosed as including the steps of opening an exhaust valve (the third exhaust valve) provided on the exhaust passage (the third exhaust passage) which communicates with an air extraction chamber (the third air extraction chamber) on the highest pressure side of the compressor through the extracted air passage (the third extracted air passage) before the start-up condition of the gas turbine reaches the range over which it causes the turning stall; and extracting air from the third air extraction chamber and exhausting the compressed air which flows through the third extracted air passage to the turbine exhaustion system through the third exhaust passage. According to this starting-up method, it is disclosed that the load applied to the rotor blades is minimized and the occurrence of the turning stall is suppressed, thereby, the starting-up characteristics of the gas turbine being enhanced.

SUMMARY OF THE INVENTION

At the gas turbine compressor, the occurrence of the turning stall causes blades vibration stress to increase. For the purpose of avoiding or suppressing such turning stall, the prescribed control has been implemented for the air extraction valves and the inlet guide vanes (hereinafter, referred to as IGV) based on the operating speed and the rotation speed. However, the conventional control disclosed in the aforementioned patent literatures inclusive is not effective to deal with the largeness of the turning stall which changes every time according to the operating conditions.

Thus, the present invention is to effectively suppress the turning stall whose behavior changes every time upon starting up and stopping the gas turbine.

In order to solve the above issue, the present invention adopts arrangement claimed up in the accompanying claims.

As one aspect of the present invention, it is characterized in the method of operating the gas turbine including a compressor, a combustor, a turbine and a generator, in which the compressor is provided with an air extraction valve, a plurality of inlet guide vanes, and a plurality of casing air extraction valves, in which the control is carried on at least one of the opening of the air extraction valve, the opening of the inlet guide vanes, and the number of openings of the casing air extraction valves which are defined as control parameters taking blade vibration stress values of the compressor as indexes based on the compressor metal temperature included in behavior parameters of the gas turbine.

According to the present method of controlling the gas turbine, by reading the behavior parameters related to the state of the turning stall from the gas turbine upon starting up or stopping the gas turbine and carrying out the control on at least one of the opening of the air extraction valve, the opening of the inlet guide vanes and the number of openings of the casing air extraction valves which are defined as control parameters so as to adjust an amount of the air to flow in and/or exhaust from the compressor based on the behavior parameters, the turning stall can be suppressed.

DETAILED DESCRIPTION

First Embodiment

Figure 1:
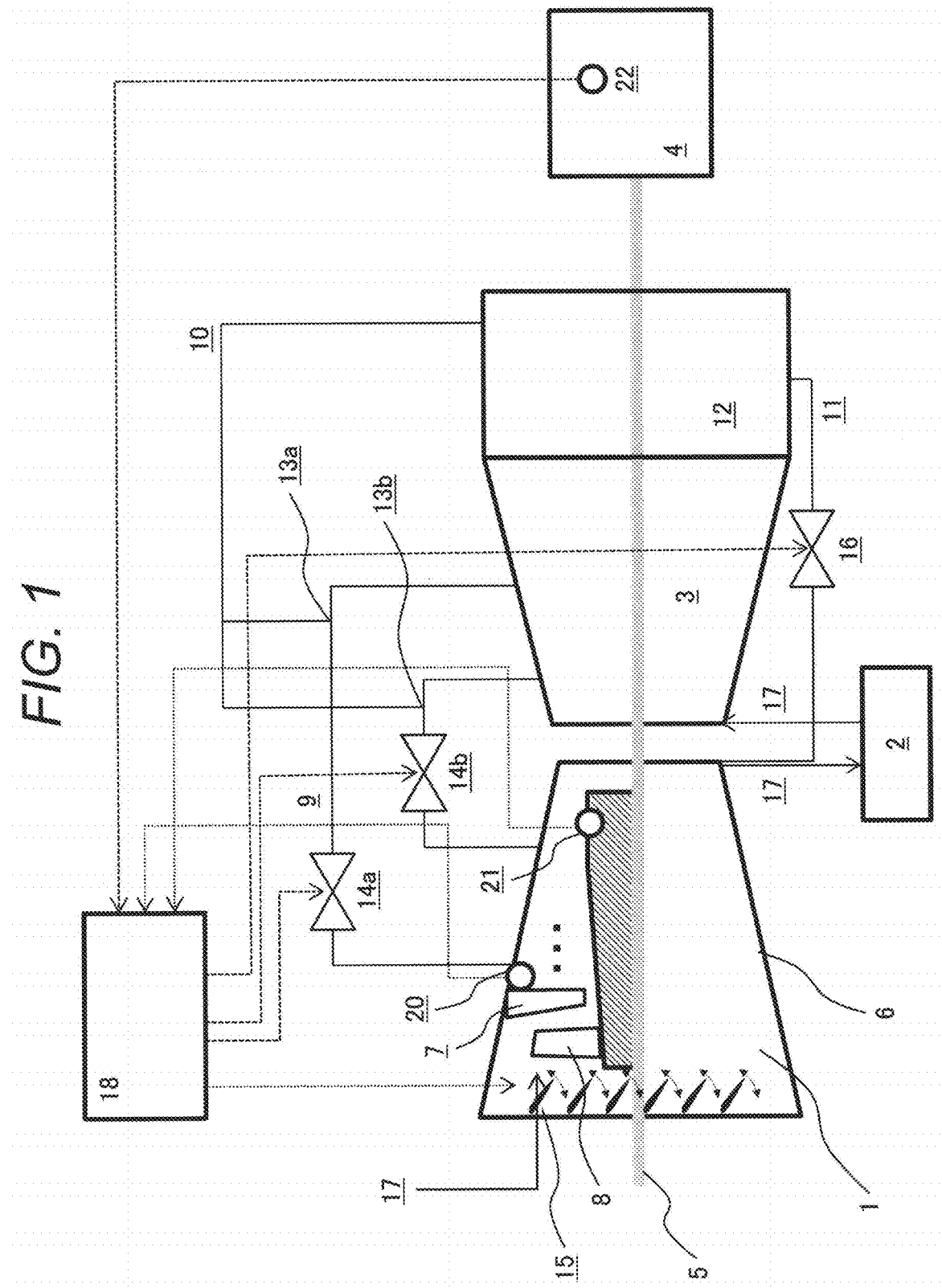
FIG. 1 is a schematic view of the gas turbine according to a first embodiment of the present invention.

FIG. 1 is a schematic view of the gas turbine according to the first embodiment. The gas turbine according to the present embodiment includes a compressor 1 having substantially an annular shape to compress air; a combustor 2 which is disposed on the downstream side of the compressor and generates combustion gas by mixing the air discharged from the compressor with fuel; a turbine 3 having substantially an annular shape to convert the energy of the combustion gas into turning power; a generator 4 to convert the turning power of the turbine into electric energy; and a control apparatus 18.

The rotor 5 is rotatably supported on the position which communicates with the substantially center sections of the compressor 1 and the turbine 3 and connects the generator 4 with the compressor 1 and the turbine 3. The compressor 1 is provided with a compressor casing 6; a plurality of inlet guide vanes 15 (IGV) which are attached to the upstream inlet in an axial direction of the compressor casing 6; compressor stator blades (compressor stationary vanes) 7 in a plurality of stages which are attached to the inner periphery of the compressor casing 6; compressor rotor blades 8 in a plurality of stages which are attached to the outer periphery of the rotor; an extracted air passage 9 to extract some of the compressed air within the compressor 1; and a plurality of casing air extraction valves 16 which are circumferentially disposed at the final stage of the compressor and are provided with an open/close valve respectively.

The extracted air passage 9 is provided with air extraction valves 14 (14a, 14b) which adjust the amount by which the extracted air is exhausted, and branch pipes 13 (13a, 13b) which branch the extracted air at the downstream of the air extraction valves and exhaust some of such extracted air to an exhaust passage 10 and connects the compressor 1 with the turbine 3. The exhaust passage 10 is connected through the branch pipes 13 (13a, 13b) to the extracted air passage 9 and is connected to an exhaust chamber 12. An exhaust passage 11 connects the compressor 1 with the exhaust chamber 12 through the casing air extraction valves 16.

Further, at least one compressor casing metal temperature sensor 20 which measures the compressor metal temperature is attached to the stage of the compressor casing 6 from its high-pressure side to low-pressure side, and a compressor rotor metal temperature sensor 21 which measures the compressor rotor metal temperature is attached to the rotor 5. In the present embodiment, the compressor metal temperature corresponds to the compressor casing metal temperature and/or the compressor rotor metal temperature.

Further, the generator 4 is provided with a gas turbine operation data detection unit 22.

The control apparatus 18 is capable of acquiring, as the behavior parameters of the gas turbine, the compressor metal temperature data (compressor casing metal temperature, compressor rotor metal temperature) which is derived from the sensor to measure the compressor metal temperature and/or gas turbine operation data (the load ratio of the gas turbine, time during which the gas turbine is operated under load and time during which the gas turbine is stopped) which is obtainable from the generator, estimating the blade vibration stress values of the rotor and stator blades of the compressor based on such behavior parameters, and outputting the control instruction to modify the opening of the IGVs, the opening of the air extraction valves or the number of openings of the casing air extraction valves which are defined as the control parameters of the gas turbine to the IGVs, the air extraction valves, and the casing air extraction valves.

Upon starting up or stopping the gas turbine, due to the mismatching between the rated design flow rate of the compressor 1 and the flow rate of the working fluid 17, excessive load is applied to the rotor blades 8 and stator blades 7 of the compressor. As a consequence, the working fluid 17 is detached from the stator blades 7 and rotor blades 8 of the compressor, thereby, the turning stall where the whirling flow resulting from such detachment transmits substantially in a circumferential direction with respect to the upstream side of the working fluid happens. Upon such turning stall happening, the rotor blades 8 and stator blades 7 of the compressor are vibrated, so that they may be damaged under excessive blade vibration stress.

As to the resulting turning stall, in the case where there is a difference in the casing metal temperature of the compressor casing 6 or the rotor metal temperature within the compressor, the flowing condition of the working fluid 17 changes, so that the turning speed of the whirling flow resulting from detachment, the number of whirling flows in the circumferential direction, and pressure fluctuation amplitude due to detachment change even when the openings of the air extraction valves 14 (14a, 14b) are under the same condition. In other words, the blade vibration stress increases according to the largeness of the turning stall.

Upon starting up or stopping the gas turbine, the air extraction valves 14 (14a, 14b) are opened while the IGVs 15 are closed, thereby, the flow rate of the compressed air within the compressor is reduced, resulting in alleviation of the turning stall.

In order to reduce the blade vibration stress to which the largeness of the turning stall contributes, according to the gas turbine according to the present embodiment, the control apparatus 18 is characterized in acquiring, as behavior parameters, the compressor metal temperature data derived from the compressor casing metal temperature sensor 20 and/or the compressor rotor metal temperature sensor 21 and the load ratio of the gas turbine, time during which the gas turbine is operated under load, and time during which the gas turbine is stopped which are obtainable from the gas turbine operation data detection unit 22; and calculating the blade vibration stress prediction values of the rotor blades and stator blades of the compressor based on the behavior parameters and outputting the control instruction to modify the opening of the air extraction valves, the opening of the IGVs or the number of openings of the casing air extraction valves which are defined as the control parameters to the air extraction valves 14 (14a, 14b), the IGVs 15 or the casing air extraction valves 16.

By detecting the behavior parameters in a real time manner and controlling the control parameters such as the opening of the air extraction valves, the opening of the IGVs, and the number of openings of the casing air extraction valves, the blade vibration stress which is prone to changing in a complex manner according to the behavior parameters upon starting up or stopping the gas turbine can be controlled and reduced, thereby, effectively and successfully reducing the turning stall.

On account that the behavior parameters include the load ratio of the gas turbine and/or time during which the gas turbine is operated under load and/or time during which the gas turbine is stopped, which leads to successfully and accurately estimating the condition of the working fluid within the compressor which changes according to the compressor metal temperature, the corrected values with higher precision to reduce the blade vibration stress for the air extraction valves 14 (14a, 14b), the IGVs 15 and the casing air extraction valves 16 can be calculated.

Further, by the compressor casing metal temperature and/or the compressor rotor metal temperature being included in the behavior parameters, the air extraction valves 14 (14a, 14b), the IGVs 15 and the casing air extraction valves 16 can be controlled with higher precision than the aforesaid method to reduce the turning stall.

To note, the behavior parameters inputted to the control apparatus 18 are not necessarily all the specified parameters, but may be in combination of some of them. Moreover, the operation history data may be detected from sources other than the generator. In addition, such parameters presumable of the turning stall condition within the compressor may be newly adopted as the temperature and the blade vibration stress of either the rotor blades of the compressor or the stator blades thereof.

Not to change the subject, the correlation among the blade vibration stress σ, the behavior parameter, and the control parameter at the first stage movable and stator blades can be expressed with the following Expression.

$$\sigma_1 = \sigma_{n1} + \frac{\partial \sigma_1}{\partial \theta}\Delta\theta + \frac{\partial \sigma_1}{\partial P}\Delta P + \frac{\partial \sigma_1}{\partial n}\Delta n + \frac{\partial \sigma_1}{\partial T}\Delta T \quad \text{Expression 1}$$

$\frac{\partial \sigma_1}{\partial \theta}$:

Influence Coefficient of IGV Opening (θ)

$\frac{\partial \sigma_1}{\partial P}$:

Influence Coefficient of Air Extraction Valve Opening (P)

$\frac{\partial \sigma_1}{\partial n}$:

Influence Coefficient of Number of Openings (n) of Casino Air Extraction Valve $\frac{\partial \sigma_1}{\partial T}$:

Influence Coefficient of Metal Temperature (T)
σ₁: Blade vibration stress Value Occurring on Blade at Specific Stage
σₙ: Blade vibration stress Value at Design Point
P: Air Extraction Opening (0<P<1)
θ: IGV Opening
n: Number of Openings of Casing Air Extraction Valve (0<n<4)

The influence coefficient is defined as stress change variation when a certain parameter has changed per unit. In the present embodiment, such influence coefficient is defined as the factor that gives influence on the blade vibration stress at the specific stage, in which such coefficient can be preliminarily found through the factory test.

For example, with the blade at the backside of which detachment of the working fluid occurs, there are some cases where the aforesaid influence coefficient tends to have the following expressions 2 to 5.

$$\frac{\partial \sigma_1}{\partial \theta} > 0 \quad \text{Expression 2}$$

$$\frac{\partial \sigma_1}{\partial P} < 0 \quad \text{Expression 3}$$

$$\frac{\partial \sigma_1}{\partial n} < 0 \quad \text{Expression 4}$$

$$\frac{\partial \sigma_1}{\partial T} > 0 \quad \text{Expression 5}$$

The aforesaid influence coefficient can be found e.g. through the method employing regression analysis based on the actual values of the vibration stress or through the Taguchi method employing the orthogonal table.

Actually, the influence coefficients are neither linear nor possibly orthogonal with each other. Accordingly, it is preferred that such influence coefficients be chosen under as many conditions as possible.

What is referred to as "σₙ: Blade vibration stress Value at Design Point" is such stress value (see Expression 6) as predetermined such that it goes below an allowable value σₘ of the blade vibration stress which is defined as a threshold value, in which it is preferred that the compressor be operated such that the stress under operation satisfies the stress at the design point.

$$\sigma_{n1} < \sigma_{m1} \quad \text{Expression 6}$$

Among the parameters of the aforesaid influence coefficients, the metal temperature defined according to the manner of operation is hard to be controlled.

In the case of the acceleration and deceleration under the same metal temperature condition (ΔT=0) as at the design point, the gas turbine is operated on the standard setting basis, thus, the turbine is operable. However, under the temperature different from that under the design condition or where the behavior parameters go over their own threshold values, the blade vibration stress may go beyond its own allowable value (see Expression 7).

$$\sigma_1 = \sigma_{n1} + \frac{\partial \sigma_1}{\partial T}\Delta T > \sigma_{m1} \quad \text{Expression 7}$$

Accordingly, it is preferred that the control of at least one of the air extraction valves 14 (14a, 14b), the IGVs 15, and the casing air extraction valves 16 be carried out starting from the detection of the compressor metal temperature.

Figure 2:
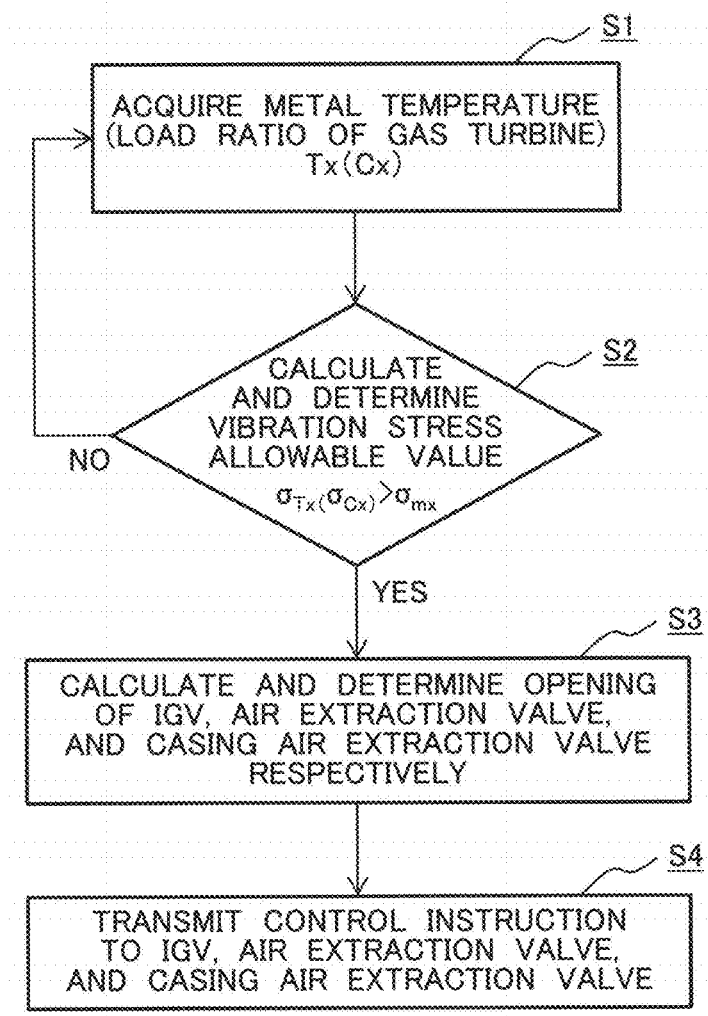
FIG. 2 is a schematic view illustrating the flow chart by the control apparatus according to the first embodiment of the present invention.

FIG. 2 is a concrete flow chart by the control apparatus 18. The control apparatus 18 includes the steps of acquiring the detected behavior parameter (S1); comparing the blade vibration stress $\sigma_{Tx}$ referred back to the behavior parameter with the predetermined blade vibration stress allowable value $\sigma_{mx}$ and proceeding to S1 when the blade vibration stress goes below its allowable value and proceeding to S3 when the blade vibration stress goes beyond its allowable value (S2); calculating and determining the control parameters for the opening of the IGVs, the opening of the air extraction valves, and the number of openings of the casing air extraction valves (S3); and outputting the calculated control parameters to each IGV, each air extraction valve, and each casing air extraction valve (S4).

To note, the blade vibration stress allowable value at S2 may be such a value as a certain margin being added to the limit value at which the blade may be damaged.

At S1, the behavior parameter is acquired from the compressor casing metal temperature sensor 20, the compressor rotor metal temperature sensor 21, and the gas turbine operation data detection unit 22, and the acquired data is forwarded to the step S2.

At S2, the blade vibration stress is calculated with reference to the behavior parameter acquired at S1 and the current control parameter, and it is determined whether or not the calculated blade vibration stress goes beyond its allowable value. To note, the expression in use for such determination may be centered on the influence coefficient of the metal temperature like the above Expression 7. The control flow proceeds to S1 when the calculated blade vibration stress goes below its allowable stress value whereas proceeding to the following S3 when the calculated blade vibration stress goes beyond its allowable stress value.

Figure 3:
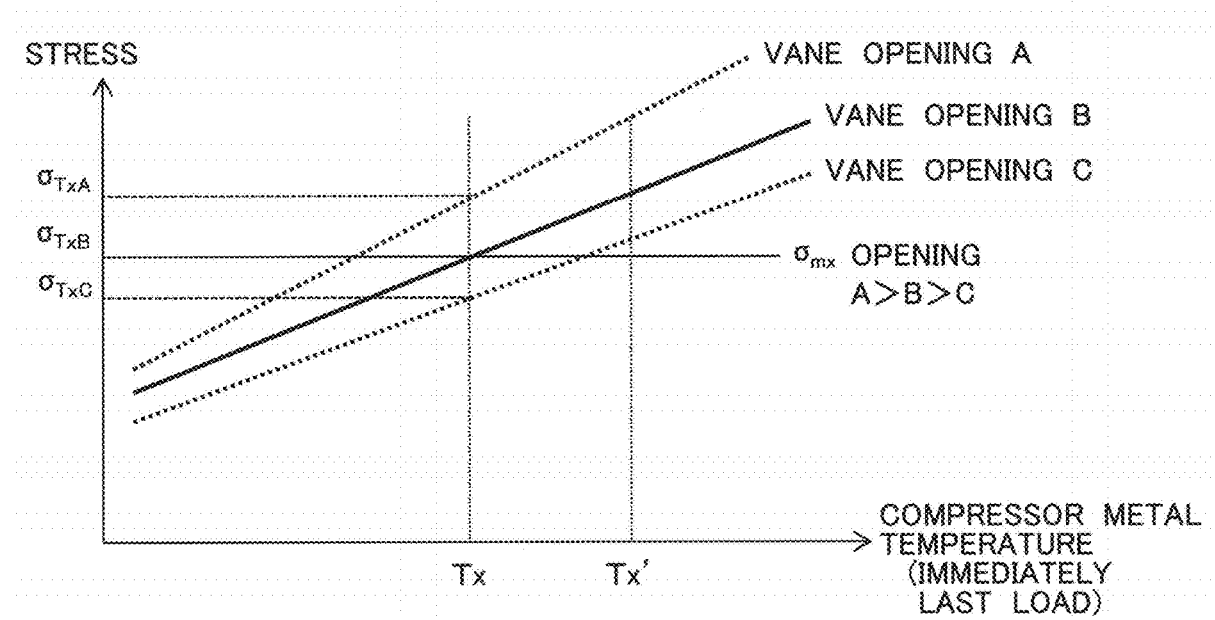
FIG. 3 is a schematic view illustrating the correlation among the compressor metal temperature, the opening of the inlet guide vane, and the blade vibration stress according to the first embodiment of the present invention.

For clarifying the concept underlining the calculation method at S2, the relation between the blade vibration stress and the compressor metal temperature is illustrated in FIG. 3.

FIG. 3 is such an illustration as the vibration stress of the blade at the specific temperature $T_x$ combined with the opening of the IGV. As illustrated in Expressions 1 and 2, on account that stress differs according to the opening of the IGV, it is possible to estimate stress at a certain temperature by preliminarily specifying the relation among the influence factors. To note, it is also possible to calculate the similar relation with respect to the air extraction valve and the casing air extraction valve.

Figure 4:
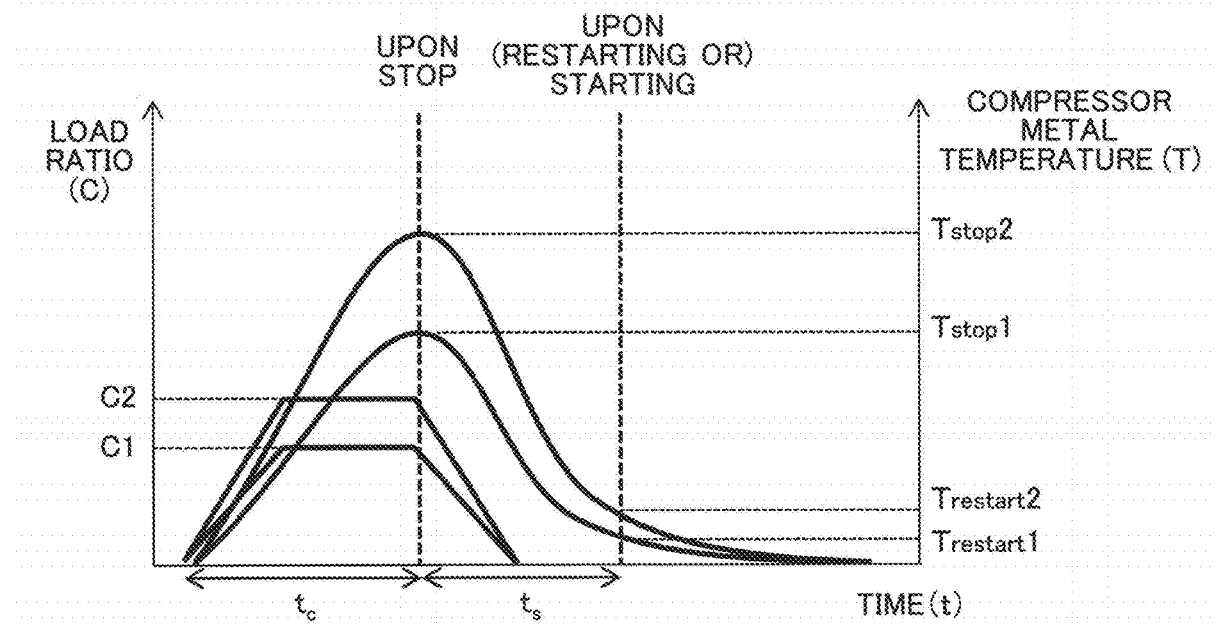
FIG. 4 is a schematic view illustrating the relation between the metal temperature and the load ratio according to the first embodiment of the present invention.

Further, at S1 and S2, the operation data may be employed as an alternative for the metal temperature or as a supplemental behavior parameter to such metal temperature. For example, the relation between the compressor metal temperature and the load ratio of the gas turbine is illustrated in FIG. 4.

The compressor metal temperature $T_{stop}$ upon stopping the gas turbine is determined by the largeness of the load ratio C and the length of time $t_c$ during which the gas turbine is operated under load. The metal temperature $T_{restart}$ when starting up the gas turbine after the lapse of a certain time from the stop is determined by the metal temperature upon stop and time $t_s$ during which the gas turbine is stopped.

Upon stop, the larger the load ratio C is and the longer the time $t_c$ during which the gas turbine is operated under load is, the higher the metal temperature $T_{stop}$ upon stop becomes. When (restarting or) starting up the gas turbine, the longer the time $t_s$ during which the gas turbine is stopped in addition to the larger the load ratio being and the longer the time during which the gas turbine is operated under load being, the lower the metal temperature $T_{restart}$ becomes. Taking into account the foregoing relations permits the load ratio C to approximate to the metal temperature T for handling.

At S3, the opening of the IGV, the opening of the air extraction valve, and the number of openings of the casing air extraction valve resulting in going below the allowable value of the blade vibration stress are calculated, and it is determined whether or not the gas turbine is operable.

As the concrete calculation method to be adopted at S3, the method (see the illustration of FIG. 5) by which the value of the opening of the IGV (hereinafter, referred to as θ), the value of the opening of the air extraction value (hereinafter, referred to as P), and the value of the number of openings of the casing air extraction valve (hereinafter, referred to n) are moved one at a time with respect to the plurality of blade vibration stresses for calculation and the method (see the illustration of FIG. 7) by which such optimal parameters as minimizing the maximum values of $\sigma_1$ and $\sigma_2$ are calculated are exemplified.

The reason reference is made to the plurality of blade vibration stresses at S3 is presumably that the detachment of the working fluid occurring on the blade differs in place so that the influence coefficients change. For example, on the blade at the backside of which the detachment of the working fluid occurs, the influence coefficients result in Expressions 2 to 5 above. On the other hand, on the blade at the frontal side of which the detachment of the working fluid occurs, such coefficients result in the following Expressions 8 to 11 which have a tendency of being contrary in direction to Expressions 2 to 5 above.

$$\frac{\partial \sigma_1}{\partial \theta} < 0 \qquad \text{Expression 8}$$

$$\frac{\partial \sigma_1}{\partial P} > 0 \qquad \text{Expression 9}$$

$$\frac{\partial \sigma_1}{\partial n} > 0 \qquad \text{Expression 10}$$

$$\frac{\partial \sigma_1}{\partial T} < 0 \qquad \text{Expression 11}$$

In this case, upon the control parameter for the first stage blade being applied to the second stage blade, the blade vibration stress of the second stage blade may go beyond its allowable value. Thus, it is preferred to calculate the values resulting in the blade vibration stresses going below their allowable values at the plural stages.

At S4, based on the determining result at S3, the calculated values θ, P and n are outputted to each IGV, each air extraction valve, and each casing air extraction valve in the form of control instruction.

Figure 5:
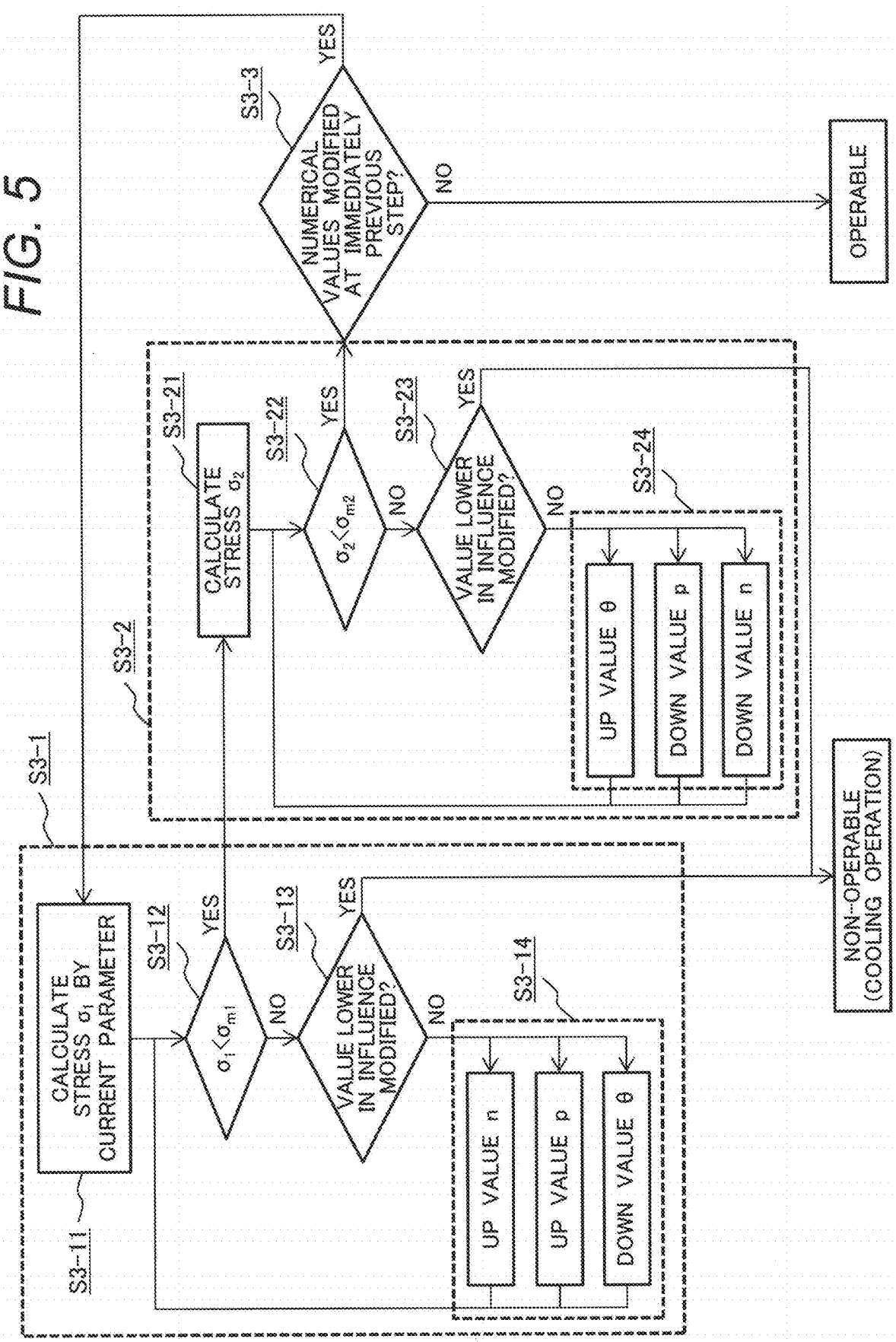
FIG. 5 is a schematic view illustrating the first example of the step S3 by the control apparatus according to the first embodiment of the present invention.

FIG. 5 is a flow chart illustrating moving and checking the values θ, P and n one at a time. The step S3 includes a sub-step S3-1 of calculating and determining the control parameter resulting in the blade vibration stress $\sigma_1$ of R1 going below its allowable value $\sigma_{m1}$, a sub-step S3-2 of calculating and determining the control parameter resulting in the blade vibration stress $\sigma_2$ of R2 going below its allowable value $\sigma_{m2}$, and a sub-step S3-3 of determining whether or not the gas turbine is operable.

The sub-step S3-1 includes a mini-step S3-11 of calculating the blade vibration stress $\sigma_1$ of the first stage rotor blade based on the parameter at the current metal temperature and the parameter received at the last second, a mini-step S3-12 of determining whether or not the calculated blade vibration stress goes below its allowable value, a mini-step S3-13 of determining it impossible to contain the blade vibration stress within its allowable value with the controllable parameter, and a mini-step S3-14 of making the influence coefficient of the blade vibration stress change.

At the mini-step S3-11, the blade vibration stress $\sigma_1$ is calculated through the input of the numerical values calculated at S2 or those received from the sub-step S3-3.

At the mini-step S3-12, the values θ, P, n calculated through the loop of S3-11 or S3-14 as described below are incorporated into Expression 1, and the control flow proceeds to S3-21 when the calculated blade vibration stress goes below its allowable value while proceeding to S3-13 when such calculated blade vibration stress going beyond its allowable stress.

At the mini-step S3-13, when it results in NO at S3-12 again upon what is the least influential among the influence coefficients with respect to the blade vibration stress $\sigma_1$ being modified at S3-14 described below, it is determined that such stress cannot go below its allowable value with the modification of the controllable numerical values θ, P, n, and the control flow proceeds to the cooling operation in terms of the metal temperature.

At the mini-step S3-14, such control parameter as the blade vibration stress at Expression 1 resulting in being reduced is calculated based on the relations of the influence coefficients preliminarily defined (see Expressions 2 to 5). Hereupon, starting from the numerical value whose influence is higher with respect to the blade vibration stress, the numerical values are sequentially modified. In the present embodiment, the numerical values are modified in the order of n, P, θ.

Figure 6:
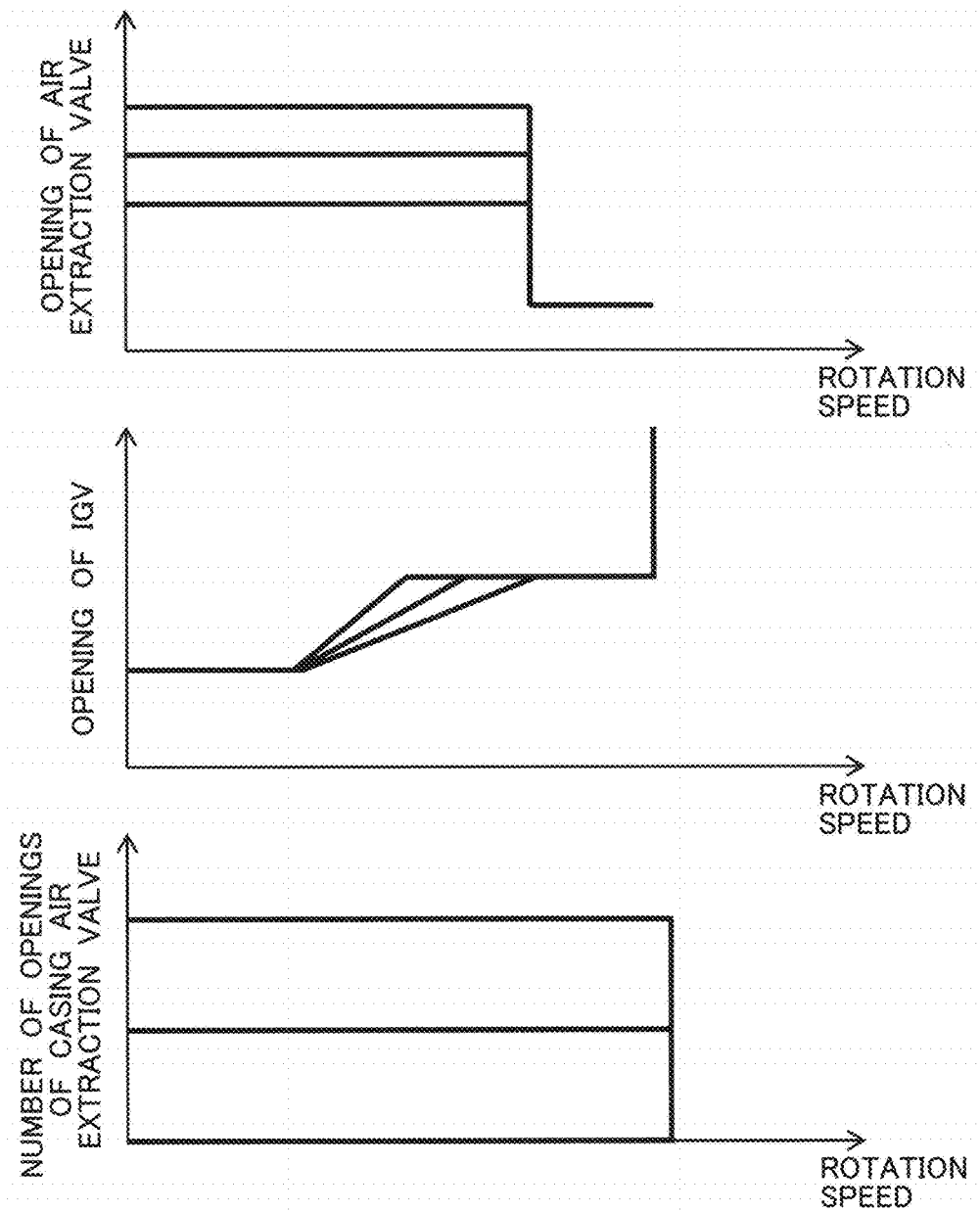
FIG. 6 is a schematic view illustrating the concrete control steps of S3 by the control apparatus according to the first embodiment of the present invention.

Such control illustrated in FIG. 6 as representing the actual control result is exemplified herein.

With reference to the illustration depicting the opening of the air extraction valve and the rotation speed, the largeness of the opening of the air extraction valve is adjusted by the control parameter, in which the opening of the air extraction valve is reduced within the range of high rotation speed taken the efficiency of the gas turbine into account. With reference to the illustration depicting the opening of the IGV and the rotation speed, the open/close timing and largeness of the opening of the IGV are adjusted by the control parameter, in which the opening of the IGV is increased within the range of high rotation speed taken the efficiency of the gas turbine into account. With reference to the illustration depicting the number of openings of the casing air extraction valve and the rotation speed, the number of openings of the casing air extraction valve is adjusted by the control parameter, in which the number of openings of the casing air extraction valve is rendered 0 within the range of high rotation speed taken the efficiency of the gas turbine into account.

The sub-step S3-2 includes a mini-step S3-21 of calculating the blade vibration stress $\sigma_2$ of the second stage rotor blade based on the parameter received from the mini-step S3-12, a mini-step S3-22 of determining whether or not the calculated blade vibration stress goes below its allowable value, a mini-step S3-23 of determining it impossible to contain the blade vibration stress within its allowable value with the controllable parameter, and a mini-step S3-24 of making the influence coefficient of the blade vibration stress change. To note, the explanation of the control flow other than the mini-step S3-24 which differs from the sub-step S3-1 is omitted below.

At the mini-step S3-24, such control parameter as the blade vibration stress resulting in being reduced is calculated based on the relations of the influence coefficients preliminarily defined (see Expressions 8 to 11). Hereupon, starting from the numerical value whose influence is higher with respect to the blade vibration stress, the numerical values are sequentially modified. In the present embodiment, the numerical values are modified in the order of θ, P, n.

To note, when the control parameter is modified with respect to the multi-stage blades as in the present embodiment, among the parameters to be modified, what is higher in sensitivity with respect to the stage where the blade vibration stress goes beyond its allowable value is modified with priority while what is lower in sensitivity with respect to the stage where such stress goes below its allowable value is modified with priority. Further, it is preferred that the control be effected only upon deceleration with the value n rendered 0 upon acceleration taken the efficiency of the gas turbine into account.

The sub-step S3-3 is intended for determining whether the control parameter received from the mini-step S3-22 is transmitted to the mini-step S3-11 to repeat the loop of the sub-steps S3-1 and S3-2 or the control parameter calculated and determined operable is transmitted to each IGV, each air extraction valve and each casing air extraction valve in the form of control instruction, in which determination is made on whether or not the loop of the mini-step S3-22 occurs at the sub-step S3-2 right before the step S3-3 based on the modification of the numerical values; every blade at the subject stage results in going below its allowable stress value when there is no modification of the numerical values, so that it is determined to be operable.

Figure 7:
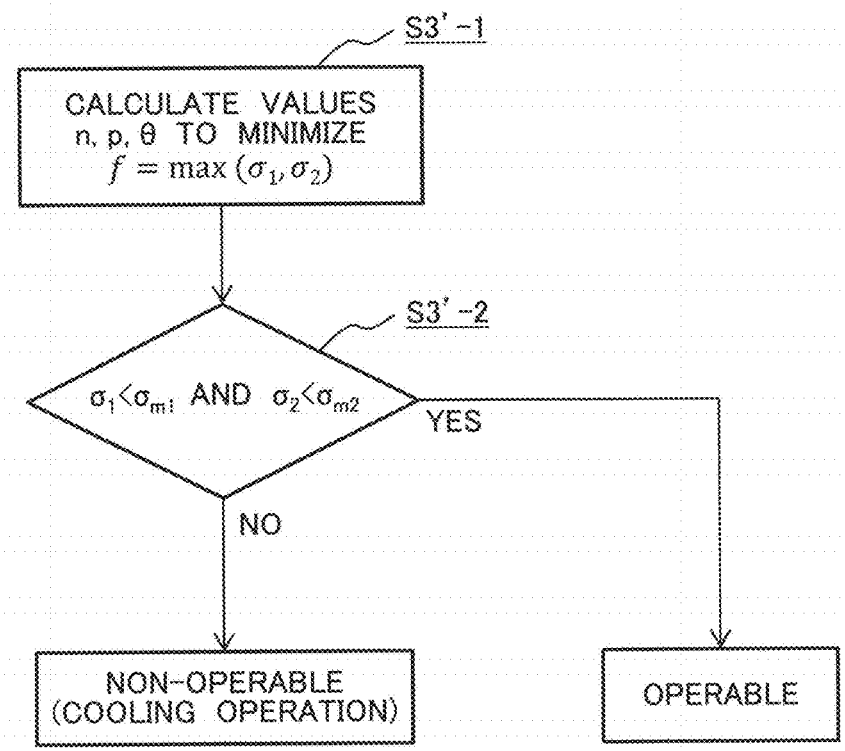
FIG. 7 is a schematic view illustrating the second example (S3') of the step S3 by the control apparatus according to the first embodiment of the present invention.

FIG. 7 illustrates, with the definition of the function: f=max ($\sigma_1$, $\sigma_2$), the flow chart to compute the values θ, P, n in which the maximum value of the f results in becoming the minimum one through the optimized calculation.

The step S3' includes a sub-step S3'-1 of computing the values θ, P, n which minimize the function: f=max ($\sigma_1$, $\sigma_2$) and a sub-step S3'-2 of determining whether or not the blade vibration stresses $\sigma_1$ and $\sigma_2$ into which the calculated control parameter is incorporated go below their allowable values.

At the sub-step S3'-1, upon computing the minimum value of the objective function: f=max ($\sigma_1$, $\sigma_2$), e.g. conjugate gradient method or generic algorithm can be employed. Further, where the control values for the values θ, P, n can only take several patterns, such control values can take such combinations as the f becoming the minimum value with the whole patterns calculated.

At the sub-step S3'-2, if it is determined to be YES and to be operable, the control flow proceeds to outputting the control parameter to each IGV, each air extraction valve, and each casing air extraction valve whereas proceeding to the cooling operation in terms of the metal temperature if it is determined to be NO.

The foregoing control flow makes it possible to operate the gas turbine placing more emphasis on safety than the control flow illustrated in FIG. 5.

At the step S4, where it is determined to be operable at S3, the control parameter computed at S3 is transmitted to each IGV, each air extraction valve, and each casing air extraction valve in the form of control instruction whereas the control instruction to the effect that the control flow proceeds to the cooling operation is transmitted to them when it is determined to be non-operable.

Under the other conditions or the operation conditions highly likely to occur such as the rated load trip, the non-rated trip, and the HOT start-up, it is desirable that the optimal values of θ P, n should be preliminarily determined.

Further, the current values θ P, n should always be renewed in preparation for the sudden trip so that the optimal operation is feasible in such circumstance.

Summing up, the turning stall can be suppressed by carrying out such control as computing the appropriate control values for the opening of the IGV, the opening of the air extraction valve, and the number of openings of the casing air extraction valve and suppressing the blade vibration stress against the situation of the turning stall changing according to the lapse of time.

To note, in the foregoing, explanation is centered only on the first and second stage blades, the third and subsequent stage blades may be taken into account as well.

Second Embodiment

The present embodiment is directed to the gas turbine provided with four casing air extraction valves in comparison with the mechanism according to the first embodiment.

With the exhaust passage 11 in which the plurality of casing air extraction valves 16 are circumferentially disposed, the exhaust amount can be suppressed by modifying the number of the valves to be opened among the plurality of circumferentially disposed valves.

As for the positions of the casing air extraction valves which open upon stopping the gas turbine, such non-uniform opening is feasible as opening only the lower half of the valves being opened while the upper half of them being closed. Further, the casing air extraction valves can be non-uniformly attached in the circumferential direction such as being attached to only to the lower half of the casing.

Figure 8:
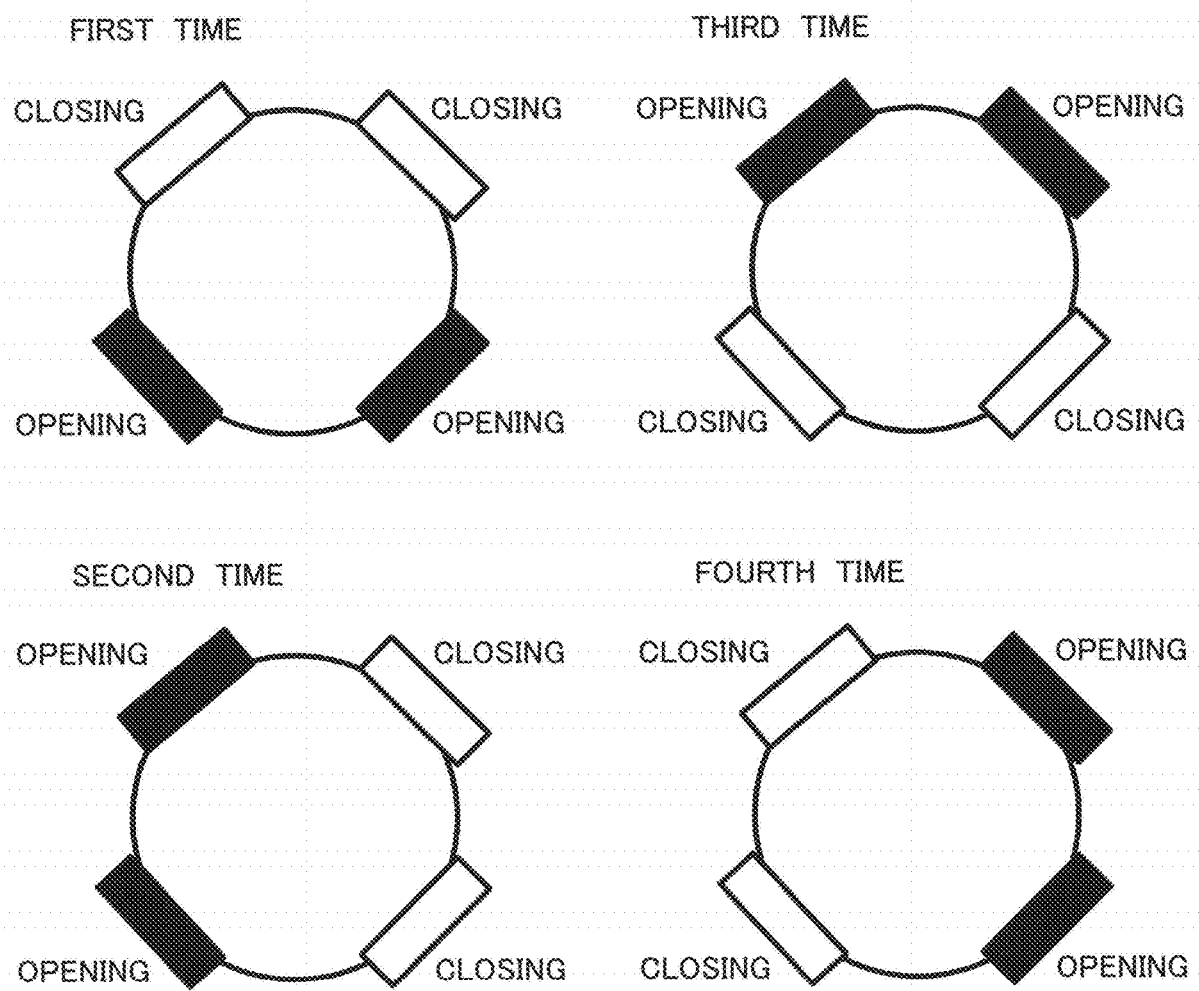
FIG. 8 is a schematic view illustrating the control of the casing air extraction valves according to a second embodiment of the present invention.

FIG. 8 illustrates a concrete and practical example for the exhaust passage 11 provided with the casing air extraction valves 16 which are circumferentially disposed. When starting up the gas turbine, the casing air extraction valves are fully closed such that its efficiency is not deteriorated whereas when stopping the gas turbine, the half of the casing air extraction valves is opened, for example, so as to discharge the working fluid 17 to the exhaust chamber because upon stop the compressor metal temperature typically rises further than upon the start-up.

At this time, the positions where such casing air extraction valves are opened are not at the opposed angles, but can be at such positions as circumferentially causing pressure deviation. Further, as to the positions where the casing air extraction valves are opened, different casing valves can be allotted per operation. By alternatively opening the casing air extraction valves per operation, the fatigue only of the open/close valves at the specific position upon start-up and stop can be avoided, thereby, successfully prolonging the replacement frequency with which air extraction valves are exchanged.

Where the metal temperature of the compressor casing or that of the compressor rotor is higher, the working fluid inflates on the rear stage side of the compressor in comparison with such temperature being lower through the thermal transmission originating from the rotor and the casing, the flow of the working fluid on the upstream side may be stagnated so as to lead to aggravating the turning stall, but with the gas turbine according to the present embodiment, such advantageous effect as suppressing the development of the turning stall is realizable by discharging the air emitted from the compressor to the exhaust chamber 12.

Further, according to the present mechanism, by e.g. opening adjacent two valves among the four casing air extraction valves so as to deliberately make the circumferential pressure distribution of the air emitted from the compressor non-uniform, such advantageous effect as preventing the development of the whirling flow resulting from detachment at the turning stall is realizable.

In the foregoing embodiments, it is disclosed that the control is implemented by detecting the behavior parameters in a real time manner. In addition, it is possible to adopt such method as preliminarily finding e.g. rotation speed and the pressure of the compressed air by which the gas turbine is subjected to the turning stall through e.g. the preliminary experiments and opening the exhaust valves when the gas turbine is started and the rotation speed and the pressure of the compressed air by which the turning stall occurs are reached.

To note, the present invention is not limited to the above embodiments, but can include various modifications. For example, the above embodiments are disclosed for the purpose of explaining the present invention in details to facilitate the persons skilled in the art to understand it, and the present invention is not necessarily limited to what is covered with the whole features explained above. Moreover, some of features according to a certain embodiment can be replaced with those of the other embodiments and the features of the other embodiments can be added to those of a certain embodiment. Furthermore, as for a part of the features of each embodiment, another feature can be added thereto and replaced therewith by deletion.

LIST OF REFERENCE SIGNS

1: compressor
2: combustor
3: turbine
4: generator
5: rotor
6: compressor casing
7: compressor stator blade
8: compressor rotor blade
9: extracted air passage
10, 11: exhaust passage
12: exhaust chamber
13a, 13b: branch pipe
14a, 14b: air extraction valve
15: inlet guide vane
16: casing air extraction valve
17: working fluid
18: control apparatus
20: compressor casing metal temperature sensor
21: compressor rotor metal temperature sensor
22: gas turbine operation data detection unit

What is claimed is:

1. A method of operating a gas turbine including a compressor, a combustor, a turbine, and a generator, in which the compressor is provided with an air extraction valve, a plurality of inlet guide vanes and a plurality of casing air extraction valves, the method comprising:
carrying out control on at least one control parameter of the gas turbine based on a plurality of behavior parameters of the gas turbine, wherein
the plurality of behavior parameters include at least a compressor metal temperature,
the control parameter is at least one of an opening of the air extraction valve, an opening of the inlet guide vanes, and a number of openings of the casing air extraction valves, and
the control is carried out at least on one of the opening of the air extraction valve, the opening of the inlet guide vanes, and the number of openings of the casing air extraction valves by predicting a blade vibration stress value of a certain stage blade of the compressor based on the behavior parameters of the gas turbine such that the predicted blade vibration stress value does not go beyond a blade vibration stress allowable value of the certain stage blade.

2. The method of operating the gas turbine according to claim 1, wherein the compressor metal temperature is one of a compressor casing metal temperature and a compressor rotor metal temperature.

3. The method of operating the gas turbine according to claim 1, wherein when at least one of the behavior parameters goes beyond a threshold value, the opening of the air extraction valve is increased in a case of the control parameter corresponding to the opening of the air extraction valve, the opening of the inlet guide vanes is reduced in a case of the control parameter corresponding to the opening of the inlet guide vanes, and the number of openings of the casing air extraction valves is increased in a case of the control parameter corresponding to the number of openings of the casing air extraction valves.

4. The method of operating the gas turbine according to claim 1, wherein the control is carried out on at least one of the opening of the air extraction valve, the opening of the inlet guide vanes, and the number of openings of the casing air extraction valves such that the blade vibration stress value of each blade at certain plural stages of the compressor does not go beyond a blade vibration stress allowable value of the each blade at certain plural stages.

5. The method of operating the gas turbine according to claim 4, wherein the each blade at the certain plural stages correspond to a first stage blade and a second stage blade, and the gas turbine is configured such that there is reverse tendency in change of the blade vibration stress value between the first stage blade and the second stage blade occurring when the control parameter is changed.

6. The method of operating the gas turbine according to claim 5 comprising:
a first step of calculating the control parameter resulting in the blade vibration stress value of the first stage blade going below the blade vibration stress allowable value of the first stage blade based on the behavior parameters;
a second step of calculating the control parameter resulting in the blade vibration stress value of the second stage blade going below the blade vibration stress allowable value of the second stage blade based on the behavior parameters in response to the first step; and
a third step of determining whether or not the blade vibration stress value of the second stage blade goes below the blade vibration stress allowable value of the second stage blade upon the control being carried out by the control parameter calculated at the first step and determining whether or not the blade vibration stress value of the first stage blade goes below the blade vibration stress allowable value of the first stage blade upon the control being carried out by the control parameter calculated at the second step,
wherein the first step is provided with a first stage blade vibration stress calculation sub-step of calculating the blade vibration stress value of the first stage blade; a first stage blade vibration stress determination sub-step of determining whether or not the calculated blade vibration stress value of the first stage blade goes below the first stage blade vibration stress allowable value; and a first control parameter adjustment sub-step of proceeding to the second step when the calculated blade vibration stress value of the first stage blade goes below the first stage blade vibration stress allowable value while modifying one of a plurality of numerical values resulting in the number of openings of the casing air extraction valves increasing, resulting in the opening of the air extraction valve being increased, and resulting in the opening of the inlet guide vanes being reduced when the calculated blade vibration stress value of the first stage blade does not go below the first stage blade vibration stress allowable value and proceeding to the first stage blade vibration stress determination sub-step,
wherein the second step is provided with a second stage blade vibration stress calculation sub-step of calculating the blade vibration stress value of the second stage blade employing the control parameter resulting in the blade vibration stress value of the first stage blade going below the blade vibration stress allowable value of the first stage blade at the first stage blade vibration stress determination sub-step; a second stage blade vibration stress determination sub-step of determining whether or not the calculated blade vibration stress value of the second stage blade goes below the blade vibration stress allowable value of the second stage blade; and a second control parameter adjustment sub-step of proceeding to the third step when the calculated blade vibration stress value of the second stage blade goes below the blade vibration stress allowable value of the second stage blade while modifying one of the plurality of numerical values resulting in the number of openings of the casing air extraction valves decreasing, resulting in the opening of the air extraction valve being reduced, and resulting in the opening of the inlet guide vanes being increased when the calculated blade vibration stress value of the second stage blade does not go below the blade vibration stress allowable value of the second stage blade and proceeding to the second stage blade vibration stress determination sub-step, and
wherein the third step includes a sub-step of determining whether or not the numerical modification is effected on the control parameter at the second step; and proceeding to the first step when the numerical modification is effected on the control parameter while operating the gas turbine by the control parameter resulting in the first stage blade vibration stress value and the second stage blade vibration stress value going below the blade vibration stress allowable value of the first stage blade and the blade vibration stress allowable value of the second stage blade respectively at the first stage blade vibration stress determination sub-step and the second stage blade vibration stress determination sub-step when the numerical modification is not effected on the control parameter.

7. A method of operating a gas turbine including a compressor, a combustor, a turbine, and a generator, in which the compressor is provided with an air extraction valve, a plurality of inlet guide vanes and a plurality of casing air extraction valves, the method comprising:
carrying out control on at least one control parameter of the gas turbine based on a plurality of behavior parameters of the gas turbine, wherein
the plurality of behavior parameters include at least a compressor metal temperature,
the control parameter is at least one of an opening of the air extraction valve, an opening of the inlet guide vanes, and a number of openings of the casing air extraction valves, and
the number of the casing air extraction valves amounts to four; and
two adjacent casing air extraction valves among the four casing air extraction valves are alternatively opened together upon stop.

8. A method of operating a gas turbine including a compressor, a combustor, a turbine, a generator, and a control apparatus, in which the compressor is provided with an air extraction valve, a plurality of inlet guide vanes and a plurality of casing air extraction valves, the method comprising:
carrying out control on at least one control parameter of the gas turbine based on a plurality of behavior parameters of the gas turbine, wherein
the plurality of behavior parameters include at least a compressor metal temperature,
the control parameter is at least one of an opening of the air extraction valve, an opening of the inlet guide vanes, and a number of openings of the casing air extraction valves, and the control apparatus carries out control at least on one of the opening of the air extraction valve, the opening of the inlet guide vanes, and the number of openings of the casing air extraction valves by predicting a blade vibration stress value of a certain stage blade of the compressor based on the behavior parameters of the gas turbine such that the predicted blade vibration stress value does not go beyond a blade vibration stress allowable value of the certain stage blade.

* * * * *